(12) United States Patent
West

(10) Patent No.: US 11,072,415 B2
(45) Date of Patent: Jul. 27, 2021

(54) NACELLE AERODYNAMIC SPOILER

(71) Applicant: SPIRIT AEROSYSTEMS, INC., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 489 days.

(21) Appl. No.: 16/111,379

(22) Filed: Aug. 24, 2018

(65) Prior Publication Data
US 2020/0062376 A1 Feb. 27, 2020

(51) Int. Cl.
*B64C 9/32* (2006.01)
*F01D 25/24* (2006.01)

(52) U.S. Cl.
CPC ............... *B64C 9/32* (2013.01); *F01D 25/24* (2013.01); *F05D 2220/323* (2013.01); *F05D 2240/15* (2013.01); *F05D 2260/901* (2013.01)

(58) Field of Classification Search
CPC ...... B64C 9/32; B64C 9/326; F05D 2260/901
USPC ........................................................ 244/113
See application file for complete search history.

(56) References Cited

U.S. PATENT DOCUMENTS

| 1,710,938 | A | * | 4/1929 | McLauchlan | B64D 27/023 244/113 |
|---|---|---|---|---|---|
| 2,254,591 | A | * | 9/1941 | Dornier | B64D 27/023 244/113 |
| 2,461,967 | A | * | 2/1949 | Devlin | B64D 27/023 244/113 |
| 2,678,785 | A | * | 5/1954 | Graham | B64D 27/023 244/113 |
| 2,698,149 | A | * | 12/1954 | Greenwood | B64C 9/36 244/113 |
| 2,942,813 | A | * | 6/1960 | English | B64C 1/32 244/129.5 |
| 2,993,413 | A | * | 7/1961 | McCormack | B64D 7/02 89/1.815 |
| 3,164,956 | A | * | 1/1965 | Colebrook | F02K 1/56 239/265.37 |
| 3,330,505 | A | * | 7/1967 | Sedlmaier | F02K 1/58 244/113 |
| 3,353,355 | A | * | 11/1967 | Jordan | F02K 1/68 60/226.2 |
| 3,774,869 | A | * | 11/1973 | Harmon | B64C 13/042 244/221 |
| 4,162,053 | A | * | 7/1979 | Bjornson | B64D 19/02 102/339 |
| 4,165,849 | A | * | 8/1979 | Fox | B64C 9/32 244/113 |

(Continued)

FOREIGN PATENT DOCUMENTS

| CA | 2982616 A1 | * | 10/2016 | ........... B32B 27/281 |
|---|---|---|---|---|
| EP | 3620644 A1 | * | 3/2020 | ............ B64D 29/06 |

(Continued)

*Primary Examiner* — Christopher P Ellis
(74) *Attorney, Agent, or Firm* — Hovey Williams LLP

(57) ABSTRACT

An aircraft engine nacelle spoiler assembly including a number of spoilers and actuators. Each spoiler has a drag surface and a nacelle connection point. The spoilers are shiftable via the actuators between a stowed position and a deployed position such that the drag surfaces are substantially parallel with the direction of relative wind when the spoilers are stowed and exposed to the relative wind when the spoilers are deployed.

18 Claims, 8 Drawing Sheets

(56) References Cited

U.S. PATENT DOCUMENTS

| | | | | |
|---|---|---|---|---|
| 4,566,657 | A * | 1/1986 | Grow | B64C 9/20 |
| | | | | 244/90 A |
| 4,717,097 | A * | 1/1988 | Sepstrup | B64C 9/323 |
| | | | | 244/217 |
| 4,783,024 | A * | 11/1988 | McDaniel | B64C 9/32 |
| | | | | 244/113 |
| 5,048,773 | A * | 9/1991 | Washington | F42B 10/143 |
| | | | | 244/3.28 |
| 5,096,144 | A * | 3/1992 | Fishwick | F02K 1/563 |
| | | | | 239/265.29 |
| 6,682,014 | B1 * | 1/2004 | Hickey | F42B 10/50 |
| | | | | 244/3.27 |
| 7,740,205 | B1 * | 6/2010 | Nahas | B64C 9/32 |
| | | | | 244/198 |
| 8,231,077 | B2 * | 7/2012 | Botich | B64C 5/12 |
| | | | | 244/17.21 |
| 10,343,764 | B2 * | 7/2019 | Hensley | B64C 25/001 |
| 2007/0176051 | A1 * | 8/2007 | Good | B64C 9/32 |
| | | | | 244/215 |
| 2009/0166475 | A1 * | 7/2009 | Binder | G01M 9/04 |
| | | | | 244/131 |
| 2013/0292490 | A1 * | 11/2013 | Chapelain | F02K 1/566 |
| | | | | 239/265.37 |
| 2017/0341730 | A1 * | 11/2017 | Dorsett | B64C 3/10 |

FOREIGN PATENT DOCUMENTS

| | | | | |
|---|---|---|---|---|
| FR | 2285297 A1 * | 4/1976 | | B64C 9/32 |
| FR | 2982323 A1 * | 5/2013 | | F02K 1/72 |
| FR | 2985782 A1 * | 7/2013 | | F02K 1/70 |
| GB | 1310463 A * | 3/1973 | | B64C 9/32 |
| WO | WO-2008101735 A1 * | 8/2008 | | B64C 9/32 |

\* cited by examiner

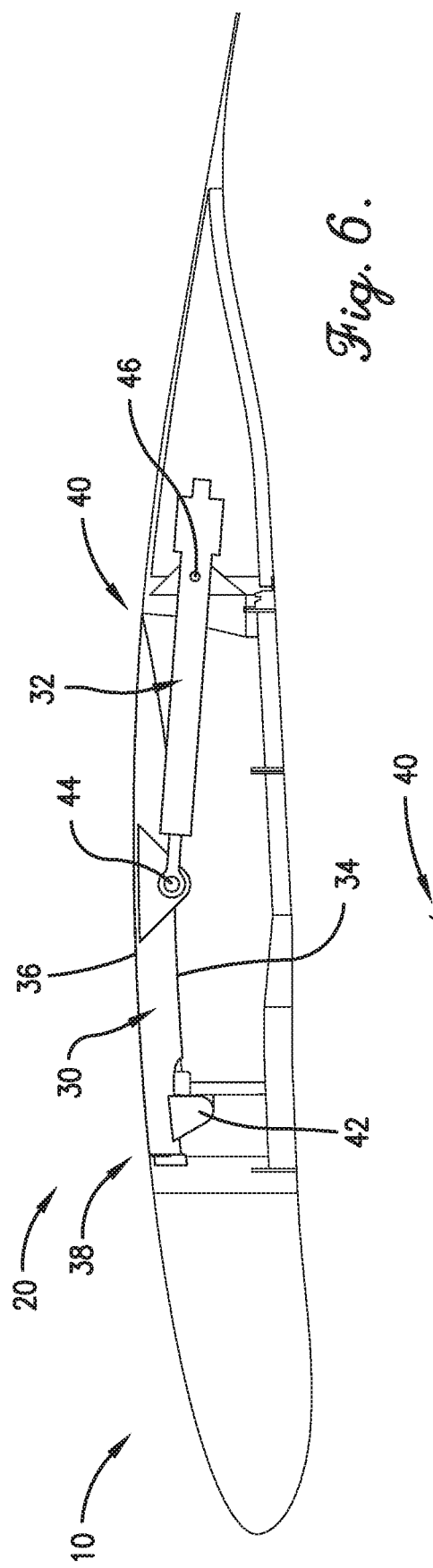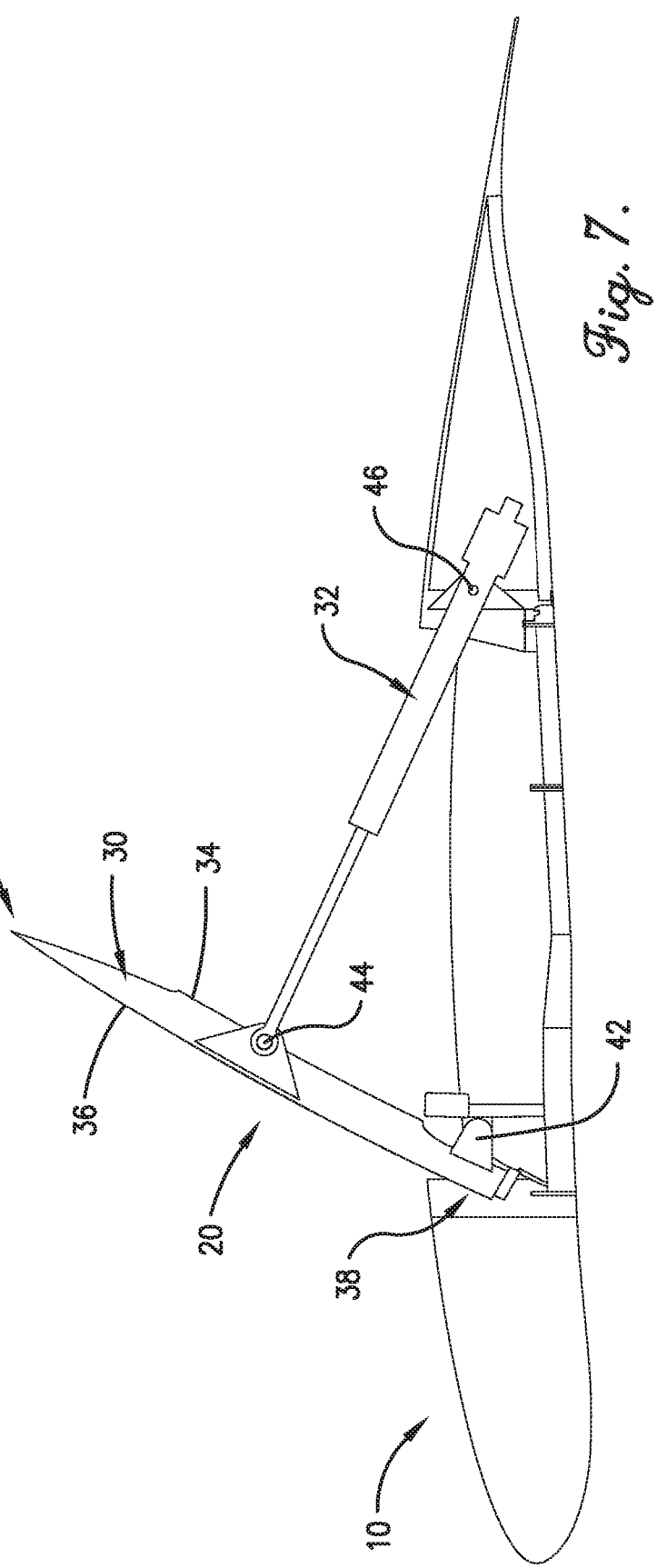

NACELLE AERODYNAMIC SPOILER

BACKGROUND

High bypass turbofan engines have increased spacing between the inner and outer flow surfaces of their fan ducts and thus require larger diameter engine nacelles. Such engine nacelles have more outer flow surface area, which increases wetted area drag. To offset this increased drag, it is desirous to reduce the overall length of the engine nacelles. However, thrust reverser doors require a minimum length, thus limiting the amount that the engine nacelle length can be reduced.

Thrust reversers also introduce complexities and inefficiencies such as additional drag and leakage that negatively affect aerodynamics and noise attenuation of the fan ducts. Thrust reverser output is also directly tied to engine thrust, which significantly hampers and complicates operation of the engines and the thrust reversers. For example, the engines must operate within a certain RPM range for the thrust reversers to be deployed. Thus, pilots often have to wait before activating the thrust reversers or increasing engine thrust, which can increase the pilots' workload during critical landing procedures.

SUMMARY

Embodiments of the present invention solve the above-described problems and other problems by providing an aircraft engine nacelle that includes a number of spoiler assemblies that do not rely on engine thrust to slow the aircraft. The spoiler assemblies increase the frontal area or drag area of the aircraft engine nacelle when deployed to quickly slow the aircraft.

An embodiment of the aircraft engine nacelle includes a pylon, a forward air inlet, a rear fan duct, an intermediate section, and the spoiler assemblies. The aircraft engine nacelle houses an engine, a bypass fan, and other thrust components.

The pylon supports the aircraft engine nacelle on a wing, fuselage, or empennage of the aircraft. For example, the pylon may space the engine nacelle forward from the wing.

The forward air inlet funnels air toward the engine and the bypass fan while allowing air to flow around the aircraft engine nacelle. The forward air inlet is curved to minimize drag.

The rear fan duct guides the air expelled from the bypass fan and is spaced behind the forward air inlet. The rear fan duct is tapered to minimize drag of the air flowing around the aircraft engine nacelle.

The intermediate section extends between the forward air inlet and the rear fan duct and includes left and right panels for accessing the engine. The intermediate section also may include an internal environment and fire barrier for preventing rain and debris from entering the engine and for preventing the spread of engine fires.

The spoiler assemblies are mounted on the left and right panels, and each includes a spoiler and an actuator. Each spoiler includes opposing outer and inner surfaces, opposing front and rear ends, a number of nacelle connection points, and an actuator connection point. The outer surface conforms to a contour of an outer surface of the intermediate section when the spoiler is in a stowed position and acts as a drag surface when the spoiler is in a deployed position. The nacelle connection points are positioned on the inner surface near the front end of the spoiler so that the spoiler is pivotably connected to the intermediate section. The actuator connection point pivotably connects the spoiler to the actuator and is positioned on the inner surface behind the nacelle connection points and the rear end of the spoiler. In one embodiment, the actuator connection point is positioned near a center of pressure of the spoiler for reducing stresses on the spoiler and for reducing the amount of force required to move the spoiler.

The actuator pivots the spoiler between a stowed position and a deployed position and is connected to the spoiler at the actuator connection point and to engine support structure at an actuator base point. The actuator may be hydraulic, electro-hydraulic, electric, pneumatic, or the like. The actuator may include a piston and rod assembly, a direct drive motor, a geared motor, a linear motor, a jack-screw, linkages, gearboxes, or any other suitable actuation mechanism.

The aircraft engine nacelle may have safeguards to prevent inadvertent or unsafe deployment. For example, the actuators may only be activated within certain ranges of airspeed, aircraft attitude, and/or absolute or above-ground altitudes, or other parameters. Alternatively, the actuators may only be activated when the aircraft is in landing gear down, flaps down, or other configurations.

The aircraft engine nacelle provides several advantages. For example, the spoilers allow a length of the aircraft engine nacelle to be reduced. The front ends of the spoilers move inward when the spoilers are deployed, which prevents them from "lifting up" in flight and scooping air, which can lead to under-cowl pressurization and potential engine damage. The actuators are attached to the spoilers near the center of pressure of the spoilers, which reduces maximum bending stresses in the spoiler and force requirements of the actuator.

The aircraft engine nacelle decouples aircraft braking from engine operation, which reduces the number of high thrust operation cycles on the engine by approximately half. The spoilers may be deployed prior to the engine being spooled down, which decreases braking reaction time. The spoilers may also retract while engine thrust is increased.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 6 is a partial cutaway view of the aircraft engine nacelle of FIG. 1 with a spoiler in the stowed position;

FIG. 7 is a partial cutaway view of the aircraft engine nacelle of FIG. 1 with a spoiler in the deployed position;

Figure 1:
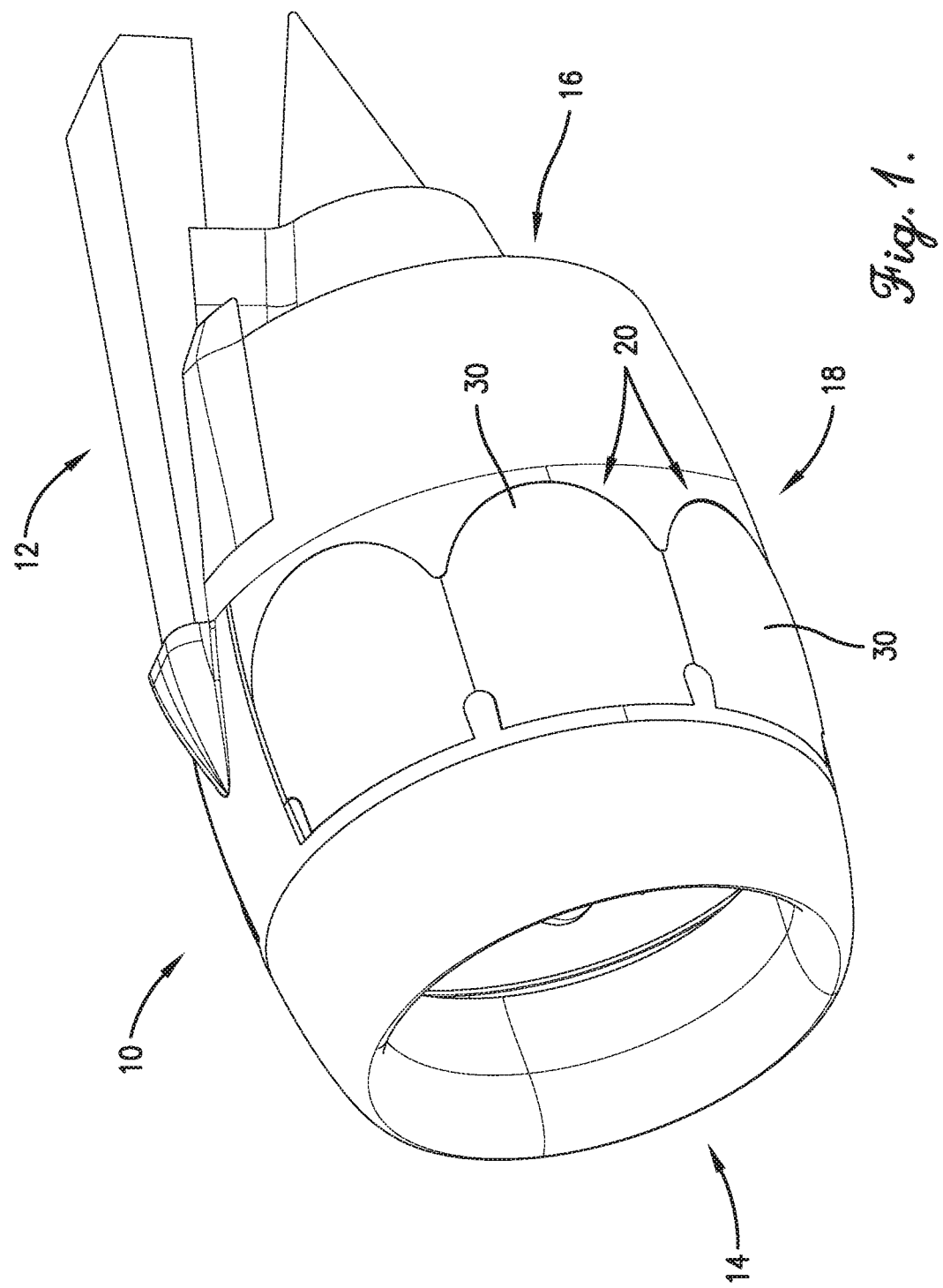
FIG. 1 is a front perspective view of an aircraft engine nacelle constructed in accordance with an embodiment of the invention, with spoilers in a stowed position.
Figure 2:
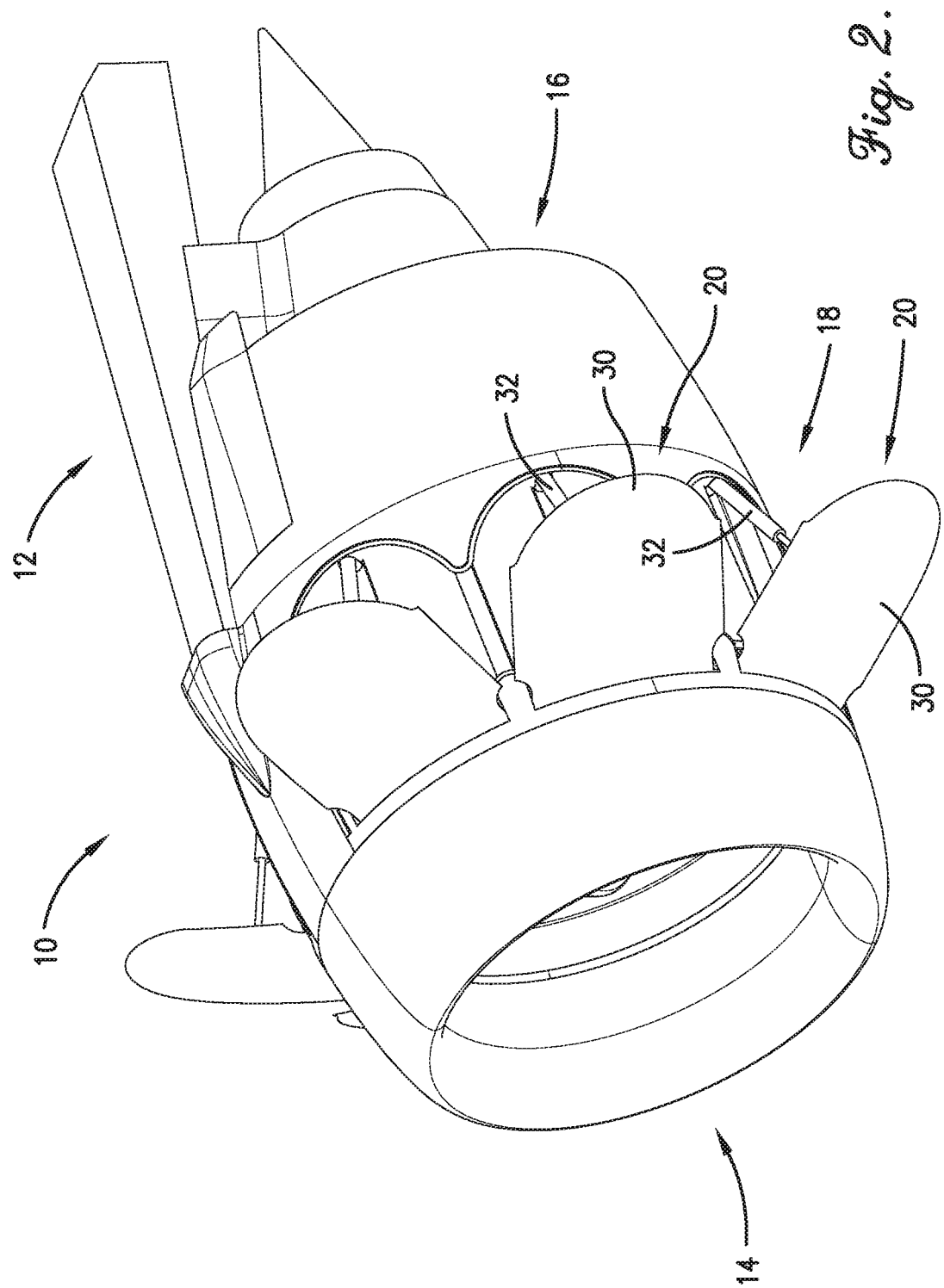
FIG. 2 is a front perspective view of the aircraft engine nacelle of FIG. 1 with the spoilers in a deployed position.
Figure 3:
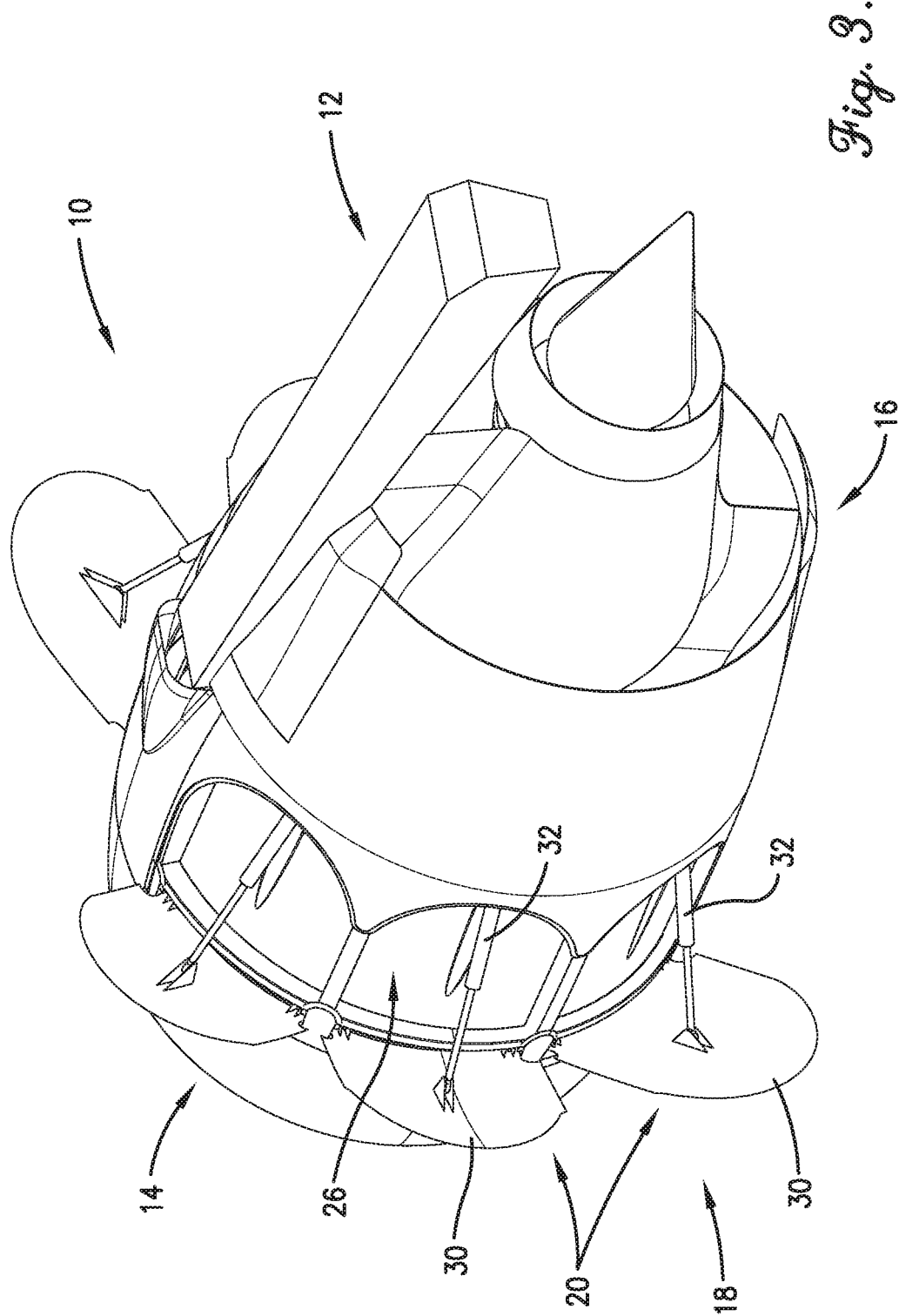
FIG. 3 is a rear perspective view of the aircraft engine nacelle of FIG. 1 with the spoilers in the deployed position.
Figure 4:
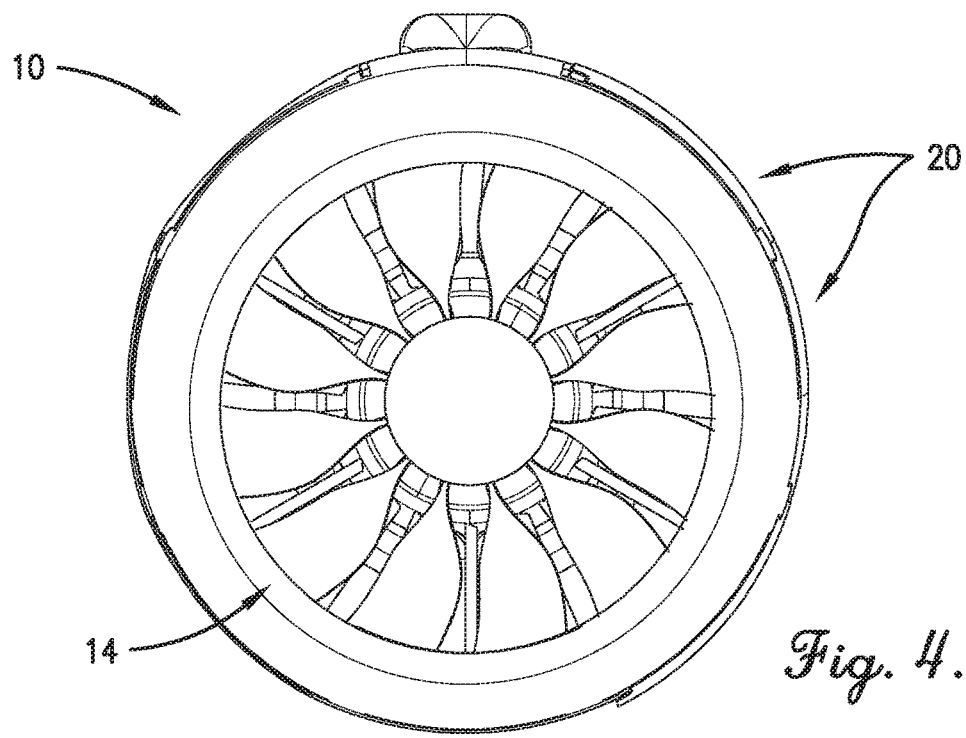
FIG. 4 is a front elevation view of the aircraft engine nacelle of FIG. 1 with the spoilers in the stowed position.
Figure 5:
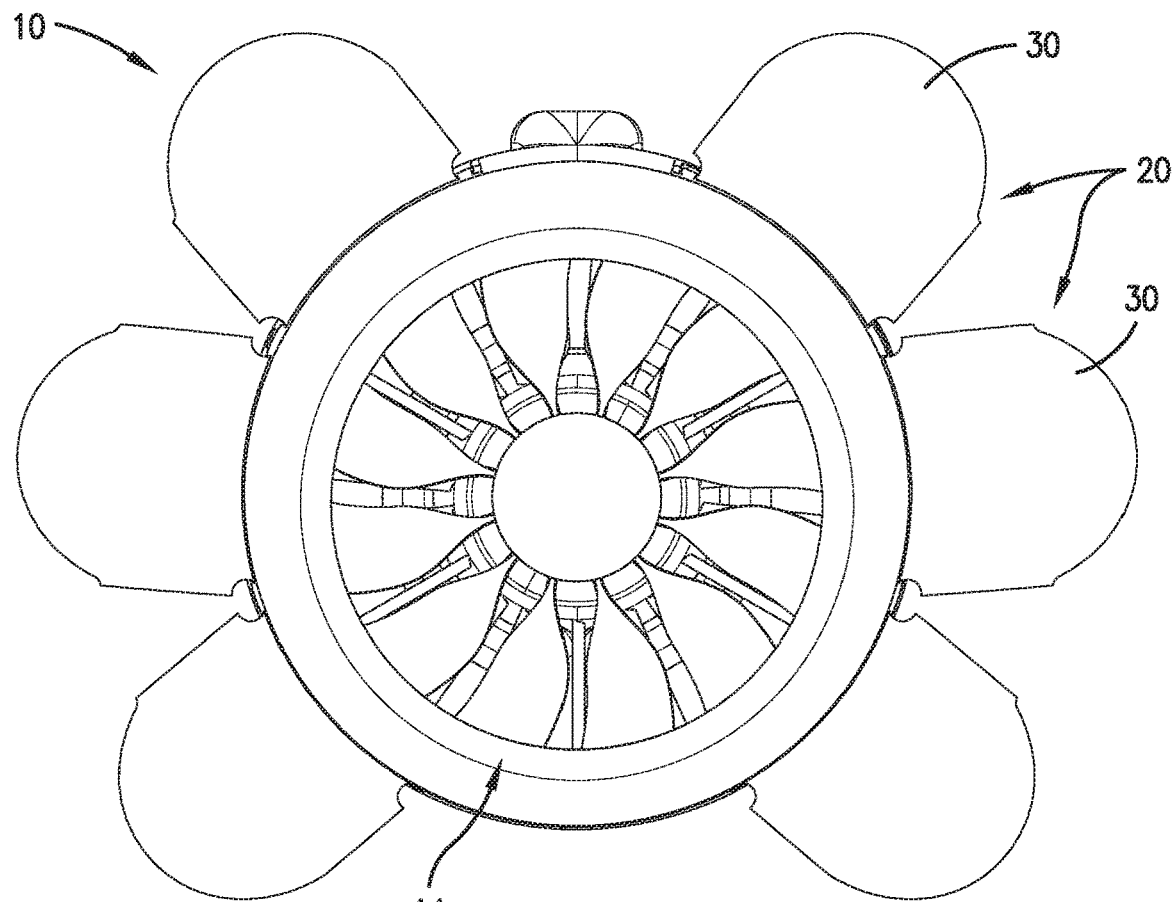
FIG. 5 is a front elevation view of the aircraft engine nacelle of FIG. 1 with the spoilers in the deployed position.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Turning to the drawing figures, and particularly FIGS. 1-8, an aircraft engine nacelle 10 constructed in accordance with an embodiment of the invention is illustrated. The aircraft engine nacelle 10 broadly comprises a pylon 12, a forward air inlet 14, a rear fan duct 16, an intermediate section 18, and a plurality of spoiler assemblies 20. The aircraft engine nacelle 10 may also include thrust reversers and may be positioned above or below an aircraft wing or on the fuselage, tail, or any other suitable part of the aircraft.

The pylon 12 may be a horizontally extending structural member attaching the aircraft engine nacelle 10 to the aircraft. The pylon 12 may also space the engine nacelle 10 forward from the aircraft wing for improved performance and so that the size of the engine nacelle 10 is not limited by the vertical space between the aircraft wing and the ground.

The forward air inlet 14 funnels air toward the engine and may be a ring-shaped fairing. The forward air inlet 14 has a rounded leading edge and gradually curving inner and outer surfaces to minimize drag as air passes into the engine and around the aircraft engine nacelle 10.

The rear fan duct 16 may have a tapered outer surface for minimizing drag as the air passing around the aircraft engine nacelle 10 meets up with the outflowing turbofan air. The rear fan duct may also have inner fins for guiding the outflowing turbofan air.

The intermediate section 18 extends between the forward air inlet 14 and the rear fan duct 16 and includes left and right panels 22, 24 and an internal environment and fire barrier 26. The left and right panels 22, 24 each include a plurality of hinge points 28 positioned near the pylon 12 such that the left and right panels 22, 24 are pivotable between a closed position and an open position (FIG. 8) for accessing the engine. The rear fan duct 16 may need to be modified to allow the left and right panels 22, 24 to pivot and/or to provide maximum access to the engine.

The internal environment and fire barrier 26 prevents rain and debris from entering the turbofan compartment and prevents fires from spreading through the opening created by the spoilers 30 when they are in the deployed position. The internal environment and fire barrier 26 may be an internal skin acting as a firewall.

The spoiler assemblies 20 are substantially identical, and thus only one spoiler assembly 20 will be described in detail. The spoiler assembly 20 increases drag when deployed and includes a spoiler 30 and an actuator 32. The spoiler assembly 20 may employ an open framework for component support and may be supported by the engine fan case. The spoiler assembly 20 is shown located as part of the intermediate section 18 but may be located anywhere along the length of the aircraft engine nacelle 10.

Figure 9:
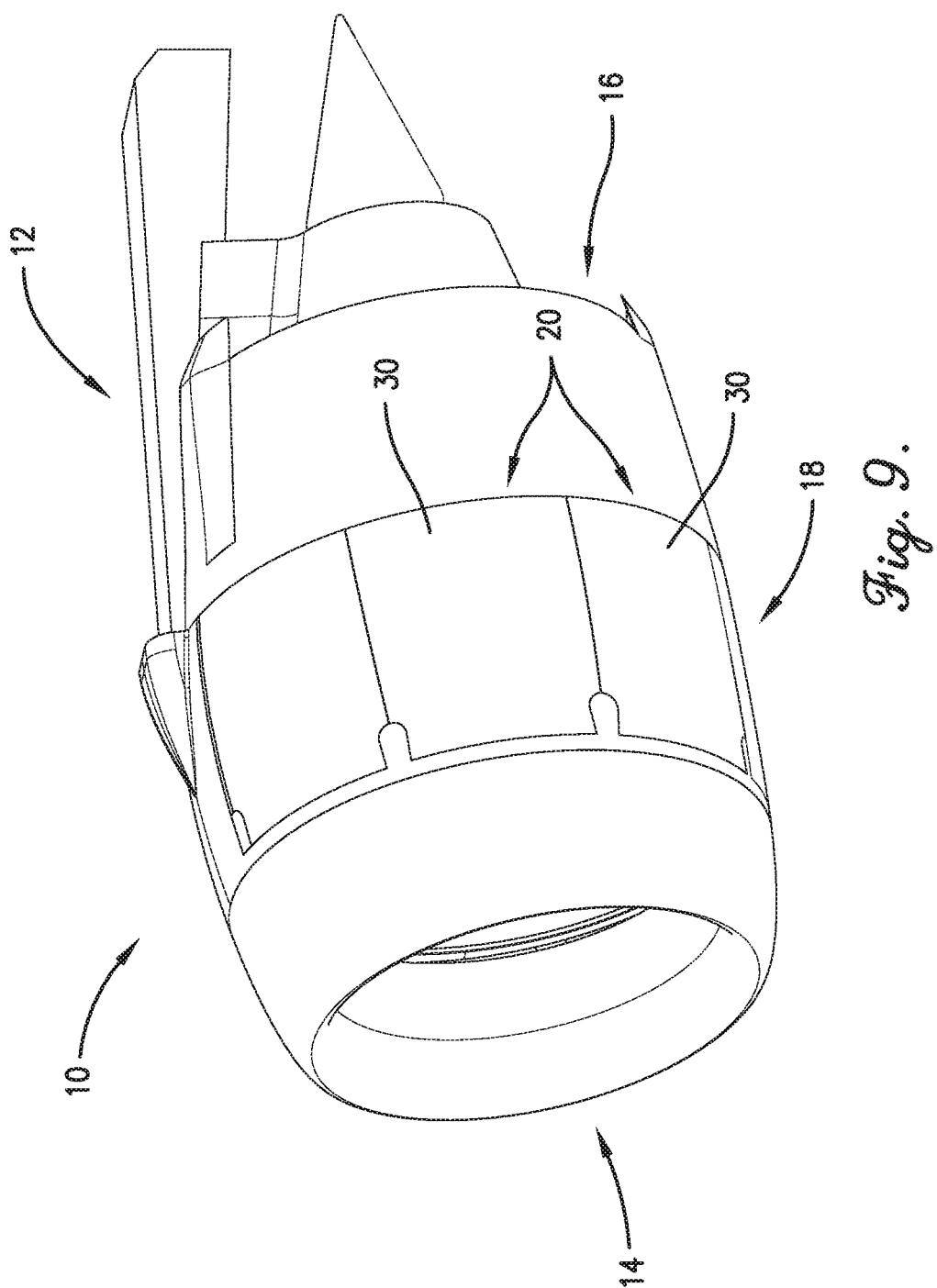
FIG. 9 is a front perspective view of an aircraft engine nacelle constructed in accordance with another embodiment of the invention, with spoilers in a stowed position.
Figure 10:
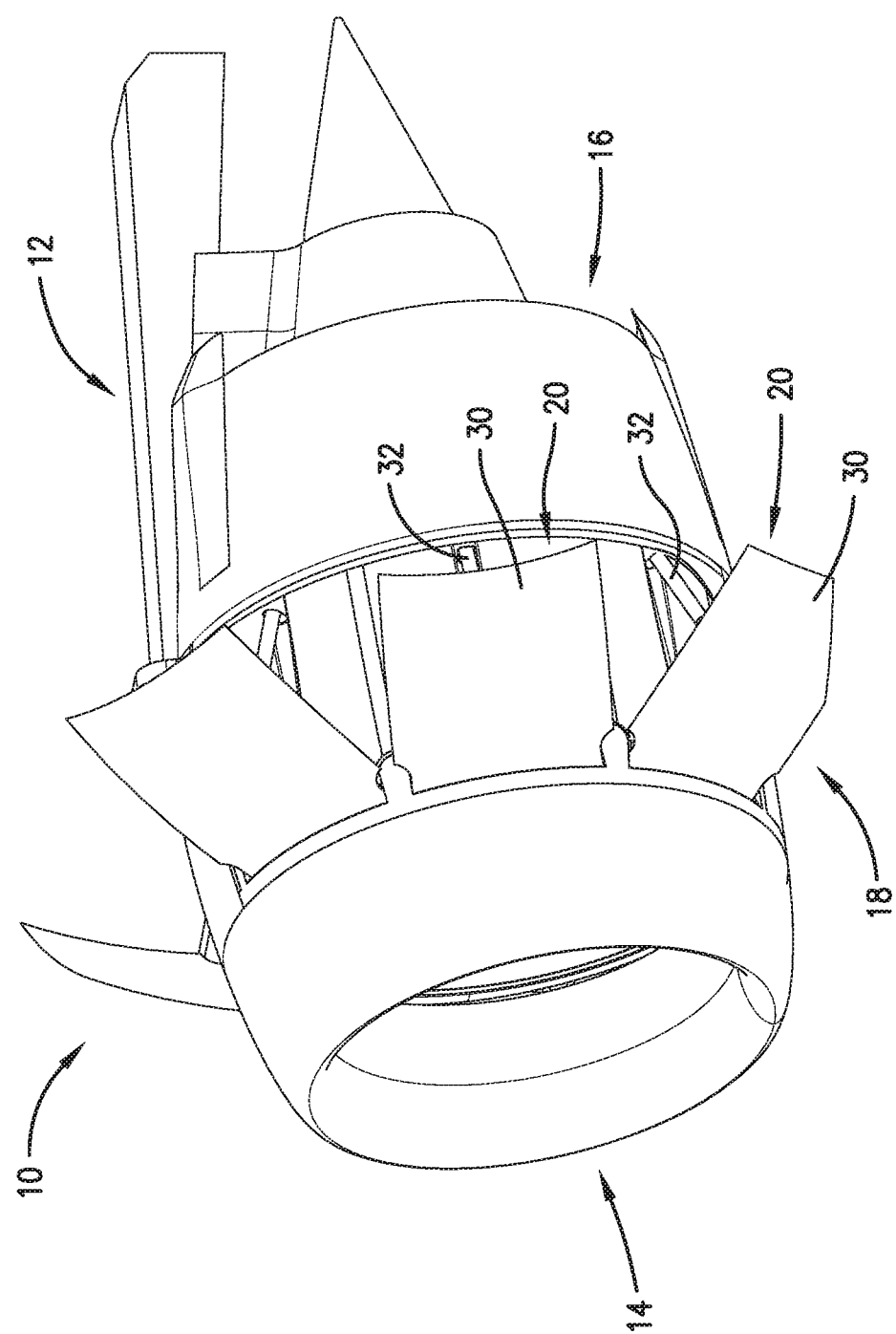
FIG. 10 is a front perspective of view of the aircraft engine nacelle of FIG. 9 with the spoilers in a deployed position.

The spoiler 30 includes an inner surface 34, an outer surface 36, a front end 38, and a rear end 40. The inner surface 34 includes a plurality of nacelle connection points 42 and an actuator connection point 44. The nacelle connection points 42 attach the spoiler 30 to the left or right panel 22, 24 or to an internal structural member. Importantly, the nacelle connection points 42 are near, yet spaced slightly behind, the front end 38, the purpose of which will be described below. The actuator connection point 44 attaches the actuator 32 to the spoiler 30 near its center of pressure to reduce maximum bending stresses in the spoiler 30 and force requirements of the actuator 32. The rear end 40 may have a curved edge (FIGS. 1-8), a rectangular/straight edge (FIGS. 9 and 10), a tapered edge, or any other suitable profile. Some profiles, such as the rectangular/straight edge, may reduce potential external skin steps and gaps produced excrescence drag.

The outer surface 36 may have a slight convex shape between the front end 38 and the rear end 40 and may be substantially smooth for minimizing drag around the aircraft engine nacelle 10 when the spoiler 30 is stowed. The outer surface 36 may be curved between its left and right sides so as to conform to a circular or near-circular outer surface contour of the aircraft engine nacelle 10.

The spoiler 30 may be formed of machined or sheet/plate metal, thermoplastic composites such as compression molding, thermoset composites such as solid laminate, sandwich, or resin infused material, or any other suitable materials or combination of materials (e.g., hybrid construction). The spoiler 30 may incorporate integral stiffening or attached stiffening. The spoiler 30 may be monolithic or may comprise a number of parts. Each spoiler 30 may have similar or different shapes depending on its position on the aircraft engine nacelle 10. The spoiler may be laterally curved to conform to a circular or curved shape of the aircraft engine nacelle 10.

The actuator 32 moves the spoiler 30 between a stowed position and a deployed position and is connected to a torque box member or other structural feature of the aircraft engine nacelle 10 at an actuator base point 46. The actuator 32 may be hydraulic, electro-hydraulic, electric, pneumatic, or any other suitable actuator. The actuator 32 may include a piston and rod assembly, a direct drive motor, a geared motor, a linear motor, a jack-screw, linkages, gearboxes, or any other suitable actuation mechanism.

In one embodiment, the intermediate section 18 includes six spoilers (three spoilers on the left panel 22 and three spoilers on the right panel 24). However, it will be understood that any number of spoilers may be used.

In flight, the spoilers 30 are retained in the stowed position. That is, the outer surfaces 36 are substantially parallel with the direction of relative wind so that drag is minimized. When the aircraft needs to quickly decelerate, such as during the landing rollout phase, the actuators 32 move the spoilers 30 to the deployed position such that the outer surfaces 36 are exposed to the relative wind and thereby increase drag. The actuators 32 may move the spoilers 30 individually/sequentially or in a synchronized fashion. The spoilers 30 may be deployed to similar or different angles. The spoilers 30 may pivot or slide outward. In one embodiment, the spoilers may move via complex motion (e.g., four-bar linkage). The above-described spoilers 30 pivot or move so as to expose the outer surfaces 36 to the relative wind. However, the spoilers 30 may pivot or move so as to expose the inner surfaces 34 to the relative wind. For example, the spoilers 30 may pivot outward from near the rear end 40.

The outer surface 36 (together with the outer surfaces of the other spoilers) may increase the frontal area or drag area of the aircraft engine nacelle 10 between approximately 25 percent to 50 percent, preferably between approximately 50 percent to 75 percent, and more preferably between approximately 75 percent to 100 percent. That is, if there are six spoilers, each outer surface 36 may increase the frontal area or drag area of the aircraft engine nacelle 10 between approximately 4 percent to approximately 8 percent, preferably between approximately 8 percent to approximately 12.5 percent, and more preferably between approximately 12.5 percent to approximately 17 percent. The actuator 32 moves the spoilers 30 back to the stowed position when the need for quick deceleration has ended. Aerodynamic forces produced when the spoilers 30 are deployed are transferred into the support framework and reacted by interfaces with the engine fan case.

The aircraft engine nacelle 10 may have safeguards to prevent inadvertent or unsafe deployment. For example, the actuators 32 may only be actuatable within certain ranges of airspeed, attitude, and/or absolute or above-ground altitudes, or other parameters. Alternatively, the actuators 32 may only be actuatable when the aircraft is in landing gear down, flaps down, or other configurations.

Figure 8:
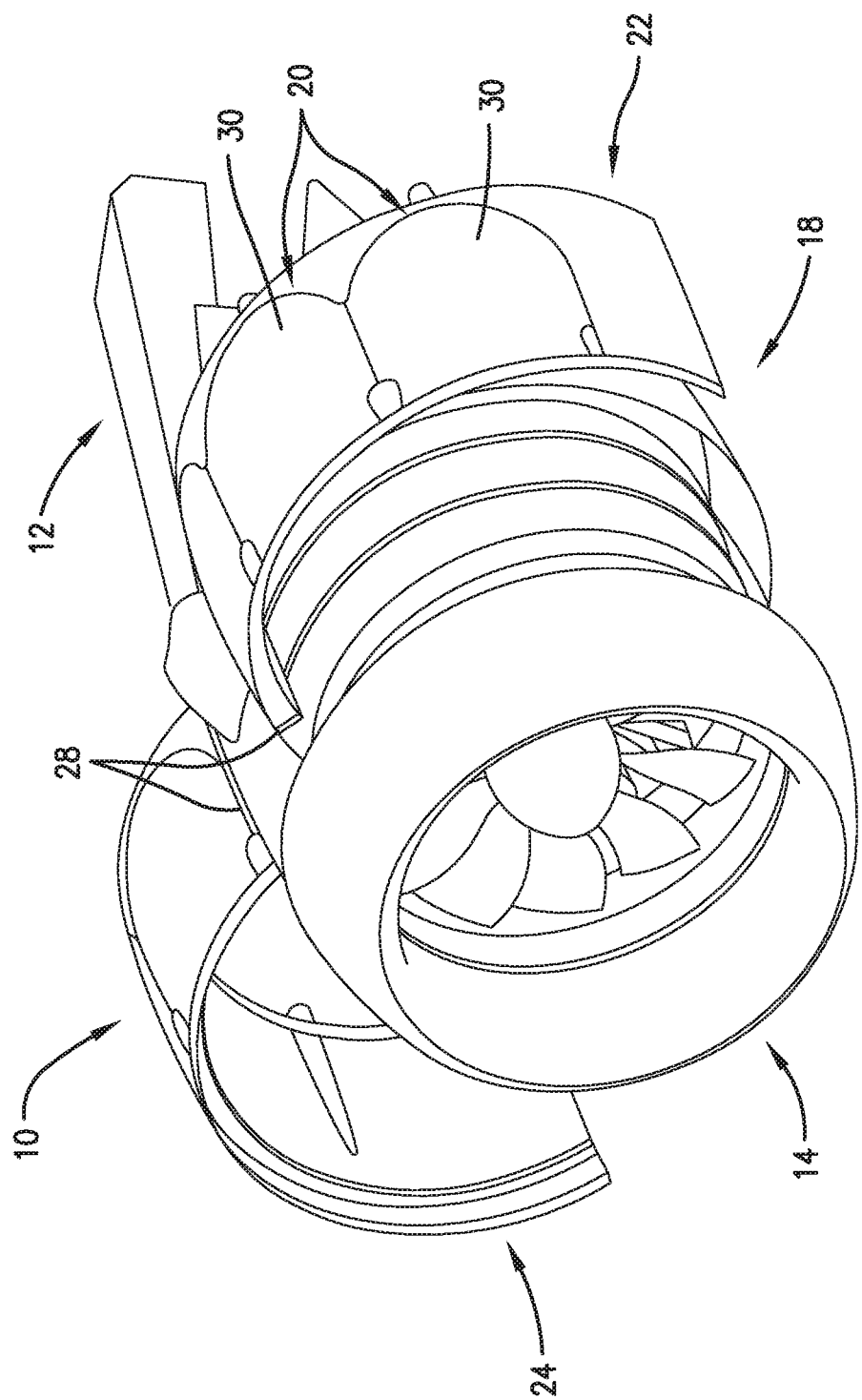
FIG. 8 is a front perspective view of the aircraft engine nacelle of FIG. 1 with left and right sides of an intermediate section in an open position.

Under-cowl equipment may be accessed with the spoilers 30 in the deployed position (or in a semi-deployed position) or through access panels in the internal environment and fire barrier 26. Alternatively, the engine may be accessed by moving the left and right panels 22, 24 of the intermediate section 18 from the closed position to the open position (FIG. 8). A portion of the aft edge of the left and right panels 22, 24 may overlap and seal against a forward portion of the rear fan duct 16. Alternatively, the rear fan duct 16 may overlap the left and right panels 22, 24 so that the intermediate section 18 does not need to be opened to allow the rear fan duct 16 to be opened. In one embodiment, the rear fan duct 16 may be of one-piece construction ("o-duct") and configured to slide rearward to allow access to portions of the engine. This o-duct rear fan duct configuration may or may not require the intermediate section 18 to be opened prior.

The aircraft engine nacelle 10 provides several advantages. For example, the spoilers 30 allow a length of the aircraft engine nacelle 10 to be reduced. The front ends 38 of the spoilers 30 move inward when the spoilers 30 are deployed, which prevents the spoilers 30 from "lifting up" in flight and scooping air, which can lead to under-cowl pressurization and potential engine damage. The spoilers 30 are aerodynamically sealed around their periphery to the underlying structure. Specifically, portions of the spoilers 30 forward of the nacelle connection points 42 seal to the undersides of the left and right panels 22, 24 while portions aft of the nacelle connection points 42 seal to lands set inside the exterior skin so that the lands depress as the spoilers 30 are stowed. The actuators 32 are attached to the spoilers 30 near the center of pressure of the spoilers, which reduces maximum bending stresses in the spoiler 30 and force requirements of the actuator 32.

The aircraft engine nacelle 10 decouples aircraft braking from engine operation, which reduces the number of high thrust operation cycles on the engine by approximately half. The spoilers 30 may be deployed prior to the engine being spooled down, which decreases braking reaction time. The spoilers 30 may also retract while engine thrust is increased.

The aircraft engine nacelle 10 also improves secondary fan flow duct performance. For example, the spoiler assemblies 20 have less complex construction compared to conventional thrust reversers, which reduces weight of the aircraft engine nacelle 10. The shorter aircraft engine nacelle 10, without thrust reverser components, increases effective acoustic attenuation within the rear fan duct 16, reduces potential leak paths within the rear fan duct 16, and reduces potential flow separation steps, gaps, and/or protrusions with the rear fan duct 16. The spoiler assemblies 20 also eliminate thrust reverser flow efflux re-ingestion.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An aircraft engine nacelle spoiler assembly comprising:
   a spoiler having opposing front and rear ends, a nacelle connection point near the front end, and an outer drag surface extending between the front and rear ends, the spoiler being shiftable between a stowed position and a deployed position such that the outer drag surface is substantially parallel with a direction of relative wind when the spoiler is in the stowed position and is exposed to the relative wind when the spoiler is in the deployed position such that the rear end is spaced outward when the spoiler is in the deployed position, the nacelle connection point being behind the front end, the spoiler being configured to pivot about the nacelle connection point such that the front end pivots inward; and
   an actuator configured to move the spoiler between the stowed position and the deployed position.

2. The aircraft engine nacelle spoiler assembly of claim 1, wherein the rear end has a curved edge.

3. The aircraft engine nacelle spoiler assembly of claim 1, wherein the spoiler is shiftable between the stowed position and the deployed position via complex motion.

4. The aircraft engine nacelle spoiler assembly of claim 1, wherein the spoiler further comprises an actuator connection point near a center of pressure of the spoiler, the actuator being connected to the spoiler at the actuator connection point.

5. The aircraft engine nacelle spoiler assembly of claim 1, wherein the spoiler is configured to be shifted to the deployed position only when a condition is met.

6. The aircraft engine nacelle spoiler assembly of claim 1, wherein the actuator is a telescoping arm.

7. The aircraft engine nacelle spoiler assembly of claim 1, wherein the spoiler is laterally curved for conforming to a circular shape of the engine nacelle.

8. The aircraft engine nacelle spoiler assembly of claim 1, further comprising a barrier shield positioned underneath the spoiler, the barrier shield forming an engine nacelle firewall and being configured to reduce environmental exposure inside the engine nacelle.

9. The aircraft engine nacelle spoiler assembly of claim 1, wherein the spoiler is configured to increase total drag area of the engine nacelle by at least 4 percent.

10. An aircraft engine nacelle comprising:
a forward air inlet for receiving air inflow;
a rear fan duct spaced behind the forward air inlet for expelling air outflow;
an intermediate section extending between the forward air inlet and the rear fan duct; and
a plurality of spoiler assemblies mounted on the intermediate section, each spoiler assembly comprising:
a spoiler having opposing front and rear ends, a nacelle connection point near the front end, and an outer drag surface extending between the front and rear ends, the spoiler being shiftable between a stowed position and a deployed position such that the drag surface is substantially parallel with a direction of relative wind when the spoiler is in the stowed position and is exposed to the relative wind when the spoiler is in the deployed position such that the rear end is spaced from the intermediate section when the spoiler is in the deployed position, the nacelle connection point being behind the front end, the spoiler being configured to pivot about the nacelle connection point such that the front end pivots inward; and
an actuator configured to move the spoiler between the stowed position and the deployed position.

11. The aircraft engine nacelle of claim 10, wherein the intermediate section includes left and right sides, the aircraft engine nacelle including six spoiler assemblies, three of the spoiler assemblies being on the left side of the intermediate section and three of the spoiler assemblies being on the right side of the intermediate section.

12. The aircraft engine nacelle of claim 10, wherein the intermediate section includes left and right sides each being pivotable between a closed position and an open position for accessing an engine.

13. The aircraft engine nacelle of claim 10, wherein the spoiler is shiftable between the stowed position and the deployed position via complex motion.

14. The aircraft engine nacelle of claim 10, wherein the spoiler further comprises an actuator connection point near a center of pressure of the spoiler, the actuator being connected to the spoiler at the actuator connection point.

15. The aircraft engine nacelle of claim 10, wherein the spoiler is configured to be shifted to the deployed position only when a condition is met.

16. The aircraft engine nacelle of claim 10, further comprising a barrier shield positioned underneath the spoiler, the barrier shield forming an engine nacelle firewall and being configured to reduce environmental exposure inside the engine.

17. The aircraft engine nacelle of claim 10, wherein the spoilers are configured to increase total drag area of the aircraft engine nacelle by at least 25 percent.

18. An aircraft engine nacelle comprising:
a forward air inlet for receiving air inflow;
a rear fan duct spaced behind the forward air inlet for expelling air outflow;
an intermediate section extending between the forward air inlet and the rear fan duct, the intermediate section including opposing left and right sides; and
a plurality of spoiler assemblies pivotably mounted to the left and right sides of the intermediate section, each spoiler assembly comprising:
a spoiler including a front end and a rear end, the spoiler having an outer drag surface and an opposing inner surface, the spoiler having an actuator connection point and a nacelle connection point on the inner surface, the nacelle connection point being near the front end for connecting the spoiler to an engine nacelle, the spoiler being pivotable between a stowed position and a deployed position such that the outer drag surface is substantially parallel with a direction of relative wind when the spoiler is in the stowed position and is exposed to the relative wind when the spoiler is in the deployed position so that the rear end is spaced from the intermediate section when the spoiler is in the deployed position, the nacelle connection point being behind the front end, the spoiler being configured to pivot about the nacelle connection point such that the front end pivots inward; and
an actuator connected to the spoiler via the actuator connection point and configured to move the spoiler between the stowed position and the deployed position, the spoilers being configured to increase total drag area of the aircraft engine nacelle by at least 25 percent.

* * * * *